United States Patent [19]

Caldwell

[11] Patent Number: 5,069,583

[45] Date of Patent: Dec. 3, 1991

[54] DEVICE FOR CHANGING FLOW PATHS IN A PNEUMATIC CONVEYING SYSTEM

[76] Inventor: Lawrence G. Caldwell, 12004 Windmere Cir., Waynesboro, Pa. 17268

[21] Appl. No.: 603,970

[22] Filed: Oct. 26, 1990

[51] Int. Cl.[5] .............................................. B65G 53/56
[52] U.S. Cl. .................................... 406/182; 406/183; 137/874
[58] Field of Search .............................. 406/181–183, 406/1, 2, 128, 129, 155; 137/874, 862, 625.17, 625.48

[56] References Cited

U.S. PATENT DOCUMENTS

| 1,479,810 | 1/1924 | Hiddleson | 137/625.12 |
| 1,524,271 | 1/1925 | Nakao | 137/625.17 |
| 4,436,459 | 3/1984 | Caldwell | 406/181 |
| 4,619,562 | 10/1986 | Brannstrom | 406/182 |

FOREIGN PATENT DOCUMENTS 698875 11/1979 U.S.S.R. .

Primary Examiner—Margaret A. Focarino
Assistant Examiner—James M. Kannofsky
Attorney, Agent, or Firm—Seidel, Gonda, Lavorgna & Monaco

[57] ABSTRACT

The present invention is an apparatus for directing a fluid stream from a source tube to a selected one of a plurality of outlet tubes in fluid flow communication with the source tube. Disposed within the source tube is an elongated sleeve, the sleeve having an inlet port and a single outlet port, the inlet port being in fluid flow communication with the source tube and the outlet port. The sleeve is longitudinally movable and rotatable within the source tube for selectively closing all of the outlet tubes and directing the fluid stream to a desired one of the outlet tubes. Apparatus is provided for rotating the longitudinally moving the sleeve.

14 Claims, 2 Drawing Sheets

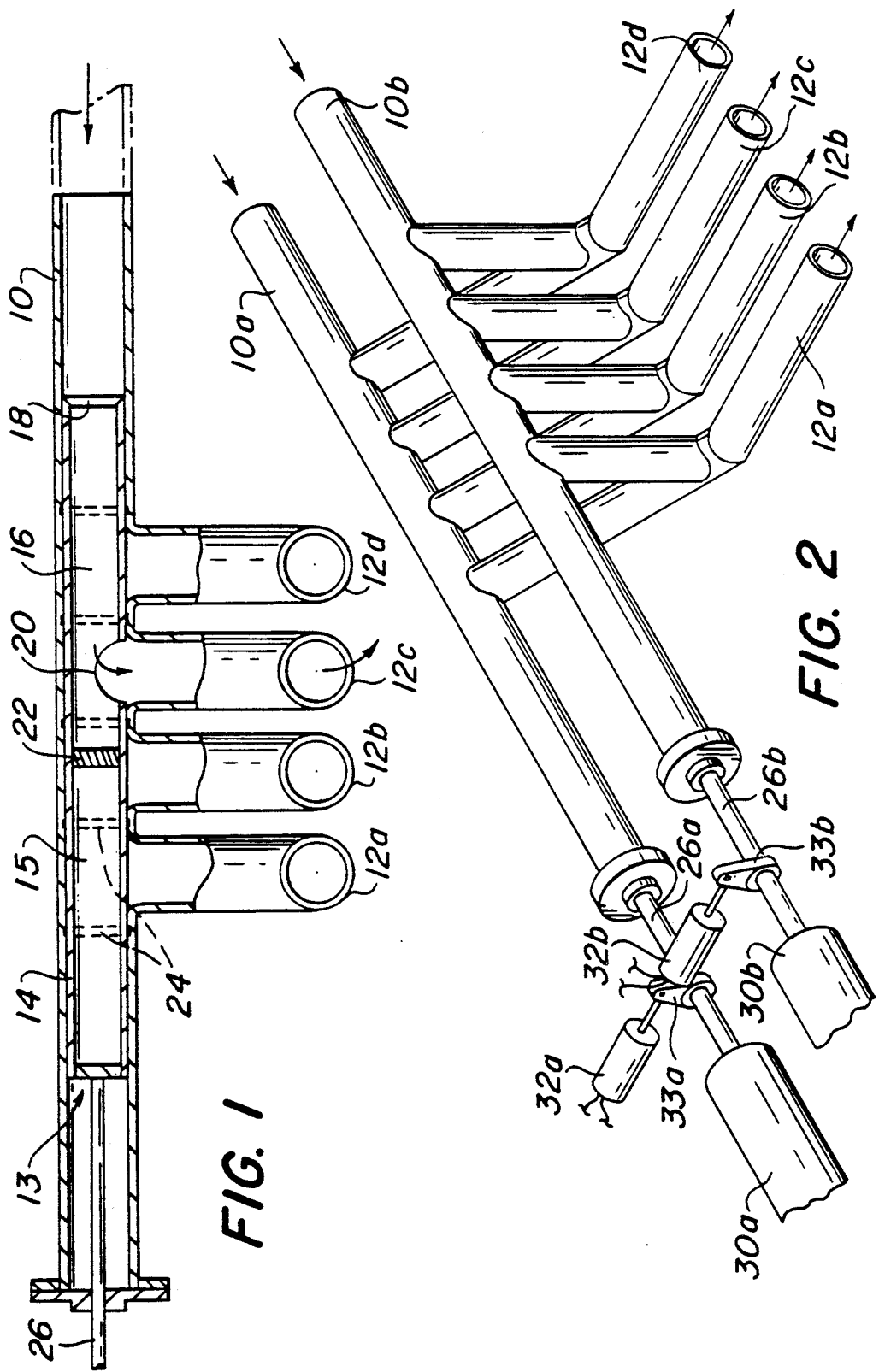

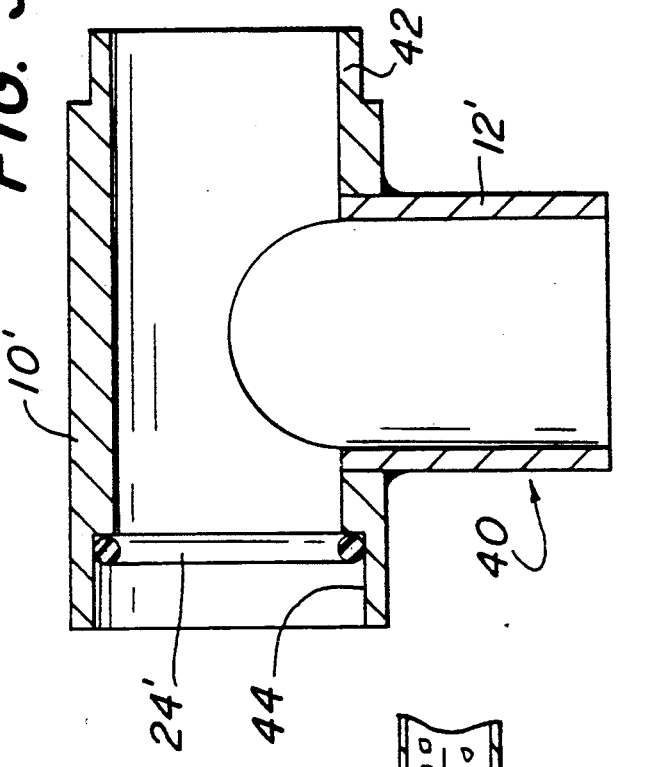
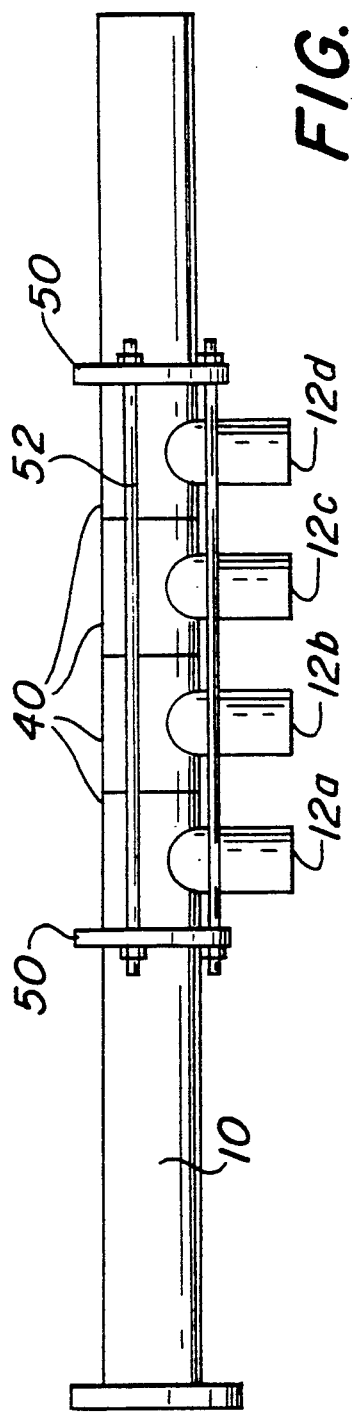

ns5,069,583

DEVICE FOR CHANGING FLOW PATHS IN A PNEUMATIC CONVEYING SYSTEM

FIELD OF THE INVENTION

The present invention is directed to a device for selectably changing the path of a fluid stream from at least one source tube to one of a plurality of output tubes.

BACKGROUND OF THE INVENTION

Pneumatic conveying systems are extensively used in industrial plants to move bulk material from point to point through tubes. In a pneumatic conveying system, the bulk material is in the form of particulate solids in a stream of air or other gas. The gas conveys the particulate bulk material through a conduit, usually in the form of a tube.

Pneumatic conveying systems operate at different gas velocities depending upon the particulate material being conveyed or the mode of conveying. The highest gas velocities are employed in the dilute phase conveying mode wherein the particulate is carried by a gas velocity typically between 3200 and 6000 feet per minute and is caused to stream through the conveying tube at high speed and with minimum contact against the tube walls.

The lowest gas velocities are employed in the dense phase conveying mode wherein the particulate moves through the conveying tube at speeds as low as 7 to 10 feet per second, in the form of a piston, or series of discrete pistons, which are in substantial contact with the tube walls.

In a typical industrial application of a pneumatic conveying system, it is desired to convey bulk material from one of a plurality of sources to at least one of a plurality of destinations or "terminals". In order to accomplish routing of the flow path as needed for various applications, a number of schemes have been utilized. A simple type of system is a manual hose switch station. In a hose switch station, a number of input tubes terminate in flexible hoses, which are manually connected as needed to a plurality of possible output tubes. The manual hose switch station has several disadvantages. It requires a person to be in physical proximity to the tubes, which may be hazardous if the particulates are poisonous or corrosive or if there is an accidental release of high pressure gas and particulates. Because the hoses must be physically handled, and the operation is awkward and arduous, it is generally accepted that the maximum diameter of these hoses be limited to six inches. There is leakage of gas out of hoses and couplings in a manual hose switch station, which has been known to waste as much as 5% of the installed gas blower horsepower. The system must be shut down for a considerable period whenever the tubes are switched. Further, it is generally preferred in industrial applications that pneumatic conveyor systems be operated from a central station, which precludes manual hose switching stations and mandates the use of remotely-operable diverter valves.

Industry presently prefers the use of a two-way diverter valve as the basic remote control switching device. A single valve permits the flow material from a source tube to be directed to either of two outlet tubes exiting the valve.

For situations where it is desired to direct flow from a source tube to three or more exit tubes, there are diverter valves with more than two outlets, but these valves have been found to be extremely complicated, expensive, and unreliable. In situations requiring three or more outlet tubes, it is customary to cascade a number of two-way valves; for example, for a three-outlet system, the source tube will first branch into two outlet tubes, and then one of the outlet tubes will then branch into two further outlet tubes, thus resulting in ultimately three outlet tubes. The number of two-way valves required in these situations is the number of output tubes (or terminals), minus one. Obviously, a requirement for a large number of terminals will make for a large number of two-way diverter valves, and complicate matters of selecting the correct valves to open.

In like manner, when it is required to pneumatically transport material from one of a plurality of sources into a single terminal, it is customarily done with two-way diverter valves.

There are some industrial situations where there are a plurality of sources of material to be conveyed, and a plurality of terminals to which the material is to be directed, and any one of the sources may need to be connected to any one of the terminals at a given time. In order to accomplish this with two-way diverter valves, trees of diverter valves must be associated with sources and terminals. In the production of plastics, for example, a typical large plant might have four pneumatic conveying systems coming from four rows of quality control silos and it may be necessary to direct the flow of any of the four systems to any of the twelve storage silos. Further, it may be necessary that all four systems be able to operate simultaneously. This arrangement could require 48 two-way diverter valves, each, typically, having an air operator, an electro-pneumatic valve, and two position limit switches. The arrangement of conveying tubes would be very complicated and require a great deal of space, compressed air would have to be piped to the 48 valves, and the electric wiring would be extensive, leading to a great capital cost and high maintenance in operation As a result, plastics plants often reject this option and install hose switching stations, with their attendant disadvantages as mentioned above.

It is an object of the present invention to provide a device for changing flow paths by remote control in pneumatic conveying systems, particularly in systems having at least one source to be conveyed in a pneumatic stream and a plurality of terminals.

SUMMARY OF THE INVENTION

The present invention is an apparatus for directing a fluid stream from a source tube to a selected one of a plurality of outlet tubes in fluid flow communication with the source tube. Disposed within the source tube is an elongated sleeve, the sleeve having an inlet port and a single outlet port, the inlet port being in fluid flow communication with the source tube and the outlet port. The sleeve is longitudinally movable and rotatable within the source tube for selectably closing all of the outlet tubes and directing the fluid stream to a desired one of the outlet tubes. Means are provided for rotating and longitudinally moving the sleeve.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a cross-sectional view of the device of the present invention, wherein one source tube is selectably connectable to four outlet tubes.

FIG. 2 is a perspective view of an embodiment of the invention having two source tubes and four outlet tubes.

FIG. 3 is a cross-sectional view of a "tee" bend as used in one embodiment of the invention.

FIG. 4 is a cross-sectional view of an "ell" bend as used in another embodiment of the invention.

FIG. 5 is a cross-sectional view of a hub used in modular construction of a system according to the present invention.

FIG. 6 is a view of an assembly of one embodiment of the present invention, showing modular construction using a plurality of hubs.

DETAILED DESCRIPTION OF THE INVENTION

FIG. 1 shows an embodiment of the present invention for a single source tube 10, which may be selectably connected to one of four outlet tubes 12a-d. Source tube 10 is part of a fluid system operating under either pressure or vacuum and is typically connected to a fluid system source (not shown), from which is produced a fluid stream which may be visualized as flowing in the direction of the straight arrow in FIG. 1. Disposed within source tube 10 is a diverter 13 comprising sleeve 14. Sleeve 14 is preferably cylindrical and is dimensioned to fit snugly within tube 10 and still be longitudinally movable and rotatable within the interior of source tube 10. Sleeve 14 comprises a bore 16, an inlet port 18, and an outlet port 20. Inlet port 18 is generally aligned with the axis of source tube 10, so that a fluid stream passing through source tube 10 in the direction of the straight arrow will enter the bore 16. Outlet port 20 is located on the circumferential surface of tube 14 so that, depending on the longitudinal position of internal sleeve 14 within source tube 10, a conduit is formed from source tube 10 through inlet port 18, bore 16, and outlet port 20, to a selected one of the outlet tubes 12a-d.

In FIG. 1, the sleeve 14 is shown in a longitudinal position relative to source tube 10 such that a conduit is formed between source tube 10 and outlet tube 12c. It should be emphasized that the sleeve 14 must be of sufficient length so as to effectively close off the non-selected outlet tubes disposed between the inlet port 18 and the selected outlet tube. In FIG. 1, outlet port 20 is aligned with the selected outlet tube 12c, while the body of sleeve 14 has closed off outlet tubes 12a, 12b and 12d. In order to be effective for all of the possible outlet tubes, the length of sleeve 14 between the edge of outlet port 20 and the edge of inlet port 18 must be long enough to close all of the remaining outlet tubes when the outlet port 20 is aligned with the outlet tube furthest from the source of pressure, in this case outlet tube 12a. In the case of the embodiment in FIG. 1, when the outlet port 20 is aligned with outlet tube 12a, the length of sleeve 14 between the outlet port 20 and the inlet port 18 must be sufficient to cover all of the outlet tubes 12b-d. In this way, the entire fluid stream from source tube 10 will be routed through outlet tube 12a, with no leakage to or from any of the other outlet tubes.

A stopper 22 is provided within sleeve 14. The stopper 22 is preferably positioned adjacent to or close to the outlet port 20 so as to form a direction change or bend between the bore 16 and the selected outlet tube, as will be explained below.

A plurality of seal rings 24 are preferably provided around the inner circumference of the source tube 10 at points between and adjacent the various outlet tubes 12. These seal rings 24, preferably but not necessarily in the form of typical O-rings, prevent leakage of the fluid stream between the outer surface of sleeve 14 and the inner surface of the source tube 10, particularly in the zone around the outlet port 20. Although in the preferred embodiment the seal rings are fixed in position around the interior of the source tube 10, it may also be preferred to include O-rings or other sealing means fixed in relation to the sleeve 14.

In addition to ring seals, other forms of seals may be used without departing from the scope of the invention. By way of example, and not by way of limitation, sleeve 14 and source tube 10 may be made with a very close clearance fit, and a gas or other fluid may be introduced into the clearance under pressure to counterbalance the tendency for outward leakage of the system fluid. The precise form of seal is not crucial to the present invention.

Sleeve 14 should also be of such a length that it may slide easily within source tube 10 to align outlet port 20 with any selected outlet tube 12. Sleeve 14 includes a back extension 15. Back extension 15 is an extension of sleeve 14 behind the stopper 22 relative to the source tube 10. With back extension 15, even when the sleeve 14 is positioned to have outlet port 20 aligned with the outlet tube closest to source tube 10, i.e., outlet tube 12d, all of the seal rings 24 will be in contact with a portion of the sleeve 14, and all of the other outlet tubes, i.e., 12a, 12b, and 12c will be sealed off from outlet tube 12d, and from each other.

Sleeve 14 is moved by a plunger 26, which comprises an elongated member having one end attached to the end of sleeve 14 opposite the end having inlet port 18, and the other end disposed external to source tube 10. Sleeve 14 is positioned longitudinally within source tube 10 at its selected position by longitudinal motion of plunger 26. Plunger 26 may also be rotated to rotate sleeve 14 relative to the source tube 10. When sleeve 14 is rotated within source tube 10 so that the outlet port 20 is facing away from any outlet tube 12, source tube 10 is effectively sealed off completely from the outlet tubes.

Of course, any other means of imparting rotary and linear motion to sleeve 14 can be used and is within the scope of the invention. For example, a hydraulic or pneumatic fluid system can be employed to move sleeve 14, instead of a plunger. The exact manner in which sleeve 14 is moved is not vital to the invention.

FIG. 2 is an alternate embodiment of the present invention, wherein two source tubes 10a,b are arranged in conjunction with four outlet tubes 12a-d. With the present invention, any number of source tubes 10 may be arranged with any number of outlet tubes 12. Each source tube 10a,b is identical to the source tube 10, and each tube 10a,b has its own sleeve essentially the same as sleeve 14 shown in FIG. 1. The sleeve (not shown) in source tube 10a may be positioned to form a conduit between source tube 10a and any selected one of the outlet tubes 12 and the same applies to source tube 10b. The fluid streams from source tubes 10a and 10b may be simultaneously directed to different outlet tubes 12a-d, or either or both of the source tubes 10a,b may have their sleeves (not shown) positioned so that there is no flow from that particular source tube.

Also shown in FIG. 2 are automated means for manipulating the sleeves in tubes 10a,b. The sleeves within source tubes 10a,b are manipulated by plungers 26a,b, respectively, in the same manner as in the embodiment shown in FIG. 1. The plungers 26a,b are operatively attached to linear actuators 30a,b and rotary actuators 32a,b. The linear actuators 30a,b are operatively attached at the ends of plungers 26a,b so that they may vary the longitudinal position of the sleeves in tubes 10a,b. The rotary actuators 32a,b are attached to the plungers 26a,b by crank arms 33a,b to enable rotation of the plungers 26a,b and the sleeves within the source tubes 10a,b. When one of the linear actuators 30a,b receives an external signal, such as from electric control means, the actuator will advance or retract the plunger 26 relative to the source tube 10, so as to move the sleeve 14 to its desired position. Similarly, when one of the rotary actuators 32a,b receives an external signal, the actuator will advance or withdraw its respective linkage to the crank arm 33. Generally only two discrete positions for the crank arm 33 need be provided by the rotary actuator 32: a first position wherein outlet port 20 of sleeve 14 is facing the outlet tubes 12' and a second position wherein the outlet port 20 is facing away from the outlet tubes 12. Thus, the rotary actuators 32a,b need only respond to one type of external signal, to move the crank arm 33 from one position or another, consistent with the two possible orientations of sleeve 14. The linear actuators 30a,b, in contrast, must be adapted to place the plunger 26 in as many discrete positions as there are outlet tubes 12 associated with the source tube. The actuators 30 and 32 may be of any type known in the art, such as hydraulic, pneumatic, or electromechanical. The actuators are capable of reasonably precise positioning of the sleeves through plungers 26. This remote activation of the actuators permits centralized and computerized manipulation of the internal sleeves, and therefore automation of the distribution fluid streams from any of a plurality of sources to any of a plurality of terminals.

Switching the flow from the source tube 10 from one of the outlet pipes 12 to another may require that the fluid flow be stopped momentarily while the sleeve 14 is repositioned to the newly selected outlet tube 12. However, in moving the sleeve 14 from one position to another, the outlet port 20 must not communicate with any outlet tubes 12 along the way, lest there be vacuum or pressure present in one of the outlet tubes due to another system being in operation. In order to prevent this cross-leakage between different outlet tubes while sleeve 14 is moving within source tube 10, the sleeve 14 is rotated, preferably 180°, away from the side of the source tube 10 having the outlet tubes 12, before the linear repositioning begins. When the sleeve 14 is placed in its newly-desired position within source tube 10, the sleeve 14 is rotated back, so that outlet port 20 is aligned with the newly-desired outlet tube. Thus, with every repositioning action, the plunger 26 is rotated to seal off all outlet ports before the sleeve 14 is repositioned.

In FIG. 2, the outlet tubes from source tube 10a are placed at an approximately 45° angle relative to the vertical outlet pipes from source tube 10b. The purpose of the 45° angle of the outlet pipes from 10a is to positively prevent any material from lodging in outlet tubes after fluid flow has been stopped. Although only two source tubes 10a,b are shown in FIG. 2, should there be three or more incoming pipes, the downward angle of the pipes exiting the source tube 10a furthest from the destination of the outlet tubes should continue so that the outlet tubes from all of the other source tubes empty generally downward before the outlet tubes bend to horizontal. The 45° angle is typical. It may be any angle so long as it exceeds the sliding angle of the material being conveyed.

FIGS. 3 and 4 are cross-sectional views of two types of bends between the source tube 10 and a outlet tube 12n, the sleeve 14 being simplified to emphasize the behavior of particulates for two embodiments of the invention.

FIG. 3 is a cross-sectional view of a "tee" bend formed within sleeve 14 at the junction of source tube 10 and a selected outlet tube 12n. To form this "tee" bend, stopper 22 is disposed a certain length a from the edge of the outlet port 20, to create a "dead pocket" 36 adjacent the outlet tube 12n beyond the source tube 10. This "tee" bend configuration is the preferred embodiment when the particulate P is flowing through the tube in the dilute phase mode and therefore at high speed. As described in U.S. Pat. No. 4,436,459 to the invertor of the present invention, this "dead pocket" 36 creates an accumulation of particulate matter P therein. This accumulation of particulate matter results in a space-efficient 90° turn of the fluid flow into the outlet tube 12n. As disclosed in the '459 patent, the "tee" bend permits a sharp turn of the fluid flow without requiring a large-radius bend in the conduit.

An additional benefit is that the turn is made without requiring a sliding, rubbing friction of the particulate against the outside tubing wall as occurs when traversing a large radius bend. Such friction produces heat and wear, and with certain plastic materials there is production of undesirable "streamers", or "angel hairs", peelings of microscopically thin plastic coatings that are dislodged from the tubing walls and then mix with and contaminate good particulate. In a "tee" bend, during flow of particulate in the dilute phase mode, the accumulation of particulate in the "dead pocket" absorbs the energy of deceleration without the sliding and rubbing friction of large radius bends and eliminates this problem at direction changes. When the flow of particulate in a conveying system is discontinued and only gas is flowing, in a few seconds the accumulation of particulate in a "tee" bend is swept away, permitting change of particulate without contamination from residue.

Another embodiment as shown in cross-sectional viewing FIG. 4 is used when the particulate P is flowing through the tube in a low-speed, dense phase mode. Here the direction change is in "ell" form, with the stopper edge directly aligned with one edge of the outlet port 20, and the surface of the stopper 22' which faces particulate flow shaped in a concave, semi-spherical, or other suitable streamlined shape, to permit passage of a piston, or series of pistons of particulate, with minimum frictional resistance.

The system of the present invention is particularly conducive to modular construction. Any number of source tubes 10 may be coordinated with any number of outlet tubes 12 in an array-type construction as shown in FIG. 2, where the source tubes 10a,b are arranged perpendicular to outlet tubes 12a–d when viewed from above, and wherein the source tubes 10a,b are disposed above the outlet tubes 12 so that the material from the source tubes 10 will empty downward into the outlet tubes 12. With modular construction, such arrays may be easily custom-built for a particular situation.

A preferred technique of construction of a system of the present invention for a particular application involves the use of modular hubs which are stacked together to form a portion of source tube 10 at its intersection with one of the outlet tubes 12. FIG. 5 is a crosssectional view of a "hub" 40 which forms a connection between the source tube 10 and one outlet tube 12. The hub 40 includes one tubular section 10', which acts as a section of source tube 10, and a perpendicular outlet tube section 12'. The tubes and hubs of the present invention may be made of metal, plastic, or any other suitable material, and portions 10' and 12' may be sealingly joined as needed.

To create a source tube 10 opening into a given number of outlet tubes 12, a plurality of hubs 40 are connected such that the source tube portions 10' are aligned to form a single tube. The series of hubs is then connected to the rest of the source tube while the outlet tube portions 12' are connected to outlet tubes for various destinations. In order to facilitate easy connection of a plurality of hubs 40, each hub 40 preferably includes a shoulder arrangement 42, 44, whereby the source tube portions 10' may be easily aligned and stacked together to form a single source tube 10. Although not shown, a similar shoulder arrangement may be used for the outlet portion 12'. Each hub 40 preferably further includes an inserted O-ring 24', which serves the same function as the sealing rings 24 shown in FIG. 1.

FIG. 6 shows an arrangement of four hubs 40, stacked together to form a portion of a source tube 10. As shown in FIG. 5, it is preferred to maintain alignment of the connections between the hubs 40 with flanges 50 disposed around the source tube 10 at either end of a stack of hubs 40. The flanges are then preferably connected by tie rods 52, which may be tightened by commonly known means, such as nuts. The arrangement of flanges 50 and tie rods 52 cause the individual hubs 40 in the stack to be urged together, thus preventing the hubs from being pulled apart by the longitudinal motion of the sleeve 14.

The system of the present invention may be used in conjunction with any type of fluid flow, such as gases, gases with particulate matter, or, conceivably, liquids with or without particulate matter therein. Conceivably, the device of the present invention may also be used for reverse fluid flow; that is, situations where there are a plurality of available sources, one of which may be selectably emptied into a single destination tube. In such a case, the source tube 10 would act as the destination tube and the outlet tubes 12a-d would act as possible source tubes. In such an application, the arrangement of sealing means would be altered accordingly. Further, within the scope of the invention, the set of source tubes 10 need not be arranged parallel to each other, nor need the outlet tubes 14 be parallel to each other. The source tubes 10 and outlet tubes 12 need not be arranged in the perpendicular arrangement shown in the drawings, nor is it always necessary for the source tubes 10 to be disposed above the outlet tubes 12.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for directing a fluid stream from a source tube to a selected one of a plurality of outlet tubes in fluid flow communication with the source tube, comprising:

elongated sleeve means coaxially disposed within the source tube, the sleeve means having an inlet port and a single outlet port, the inlet port being in fluid flow communication with the source tube and the outlet port, the sleeve means being longitudinally movable and rotatable within the source tube for selectively closing all outlet tubes and directing the fluid stream to a desired one of the outlet tubes while closing the remaining outlet tubes; and means for rotating and longitudinally moving the sleeve means.

2. Apparatus as in claim 1, further including stopper means disposed within the elongated sleeve means forming a tee-bend between the source tube and the selected outlet tube.

3. Apparatus as in claim 1, further including stopper means disposed within the elongated sleeve means forming a ell-bend between the source tube and the selected outlet tube.

4. Apparatus as in claim 1, further including sealing means disposed between the elongated sleeve means and the interior of the source tube.

5. Apparatus as in claim 4, wherein the sealing means are disposed around the inner perimeter of the source tube at points adjacent to and between the outlet tubes.

6. Apparatus as in claim 1, wherein the means for rotating and longitudinally moving the sleeve means includes an elongated member disposed generally parallel to the source tube, having a first end disposed within the source tube and attached to the internal sleeve, and a second end disposed external to the source tube.

7. Apparatus as in claim 6, further including means for automatically rotating and moving the elongated member in response to remotely-generated commands.

8. Apparatus as in claim wherein t he source tube includes a plurality of modular hubs, each modular hub forming a section of the source tube and section of at least one outlet tube.

9. Apparatus as in claim 8, wherein each modular hub further includes at least one sealing member disposed therein.

10. A network for the directing of fluid streams from at least one of a plurality of source tubes to at least a selected one of a plurality of outlet tubes, each source tube comprising:

elongated sleeve means coaxially disposed within the source tube, the sleeve means having an inlet port and a single outlet port, the inlet port being in fluid flow communication with the source tube and the outlet port, the sleeve means being longitudinally movable and rotatable within the source tube for selectively closing all outlet tubes and directing the fluid stream to a desired one of the outlet tubes, and means for rotating and longitudinally moving the sleeve means.

11. A network as in claim 10, further including means for automatically moving and rotating the internal sleeves in the source tubes in response to remotely-generated commands.

12. A network as in claim 10, wherein the source tubes are generally parallel to each other, the outlet tubes are generally parallel to each other, and the source tubes and outlet tubes are generally perpendicular to each other when viewed from above.

13. A network as in claim 12, wherein the outlet tubes are disposed underneath the source tubes.

14. A network as in claim 13, wherein the outlet tubes connected to at least one source tube slope downward from the at least one source tube underneath at least one other source tube before becoming horizontal.

* * * * *

UNITED STATES PATENT AND TRADEMARK OFFICE
CERTIFICATE OF CORRECTION

PATENT NO. : 5,069,583

DATED : 12/3/91

INVENTOR(S) : Lawrence G. Caldwell

It is certified that error appears in the above-identified patent and that said Letters Patent is hereby corrected as shown below:

Abstract, last line: change "the" to --and--.

Col. 8, line 1   change from "Apparatus as in claim wherein t he source tube" to --Apparatus as in claim 1, wherein the source tube--

Signed and Sealed this

Thirtieth Day of March, 1993

Attest:

STEPHEN G. KUNIN

*Attesting Officer*   Acting Commissioner of Patents and Trademarks